Nov. 3, 1942.  V. O. ALLEN ET AL  2,300,855

METHOD OF DRILLING DIAMONDS

Filed Dec. 9, 1941

INVENTORS
Victor O. Allen
Richard A. Macintosh
BY
ATTORNEY

Patented Nov. 3, 1942

2,300,855

UNITED STATES PATENT OFFICE 2,300,855

METHOD OF DRILLING DIAMONDS

Victor O. Allen, Madison, and Richard A. Macintosh, Montclair, N. J., assignors to Wilbur B. Driver Company, Newark, N. J., a corporation of New Jersey Application December 9, 1941, Serial No. 422,222

5 Claims. (Cl. 125—30)

This invention relates to the art of drilling cavities and holes in and through hard crystalline material, such as diamonds, and more particularly to the art of forming diamond dies.

Heretofore in the art, the drilling of cavities and holes in and through hard crystalline material, such as diamonds, particularly for the purpose of forming diamond dies, has been most generally effected by mechanical attrition means. In Bergmann, et. al., Patent 2,258,480 issued October 7, 1941, it is proposed to effect the drilling of cavities and holes in and through hard crystalline materials by means of a spark-like electrical discharge obtained by inserting the diamond under the surface of an electrolyte which is liquid at room temperatures between a pair of electrodes, one of which is in contact with the diamond and the other of which is spaced therefrom and passing an electric current between the electrodes at such a voltage that electrolysis of the electrolyte is inhibited and a spark-like discharge produced at the point of contact of the electrode with the diamond.

One of the objects of the present invention is to improve the invention disclosed and claimed in this Bergmann, et al., patent.

Another object is to provide an economically practical method and means for boring cavities and holes in and through hard crystalline material such as diamonds.

Still another object is to provide an electrical discharge means for rapidly boring cavities and holes in and through hard crystalline material, such as diamonds, adapted to be controlled and regulated in such manner as to obtain holes of the desired diameter and particularly of diameters less than .002 inch.

A further object is to provide a method and means for forming diamond dies, particularly diamond dies having relatively small die openings therein below about .002 inch.

Other objects and advantages will be apparent as the invention is more fully hereinafter disclosed.

In accordance with these objects we have discovered that by employing high voltage-high frequency alternating electric current, particularly alternating current having the relatively high frequency characteristics of radio frequency electric currents (10 to 30,000 kilocycles) the drilling of hard crystalline materials, such as diamonds, by means of a sustained spark-like discharge between the contacting electrode and the surface of the diamond in accordance with the invention described and claimed in the above identified Bergmann, et al., patent is greatly facilitated, the drilling time materially decreased, and by appropriate regulation of the voltage of the high frequency current and the frequency thereof the diameter of the bored hole or cavity may be closely controlled, all as will be more fully hereinafter disclosed.

We have found that with alternating electric currents of the usual 60 cycle frequency, the rate of drilling by means of the spark-like discharge obtained at voltages above the voltage at which electrolysis of the electrolyte is inhibited in accordance with the Bergmann, et al., invention, is directly dependent upon the hardness of the material to be drilled and that with material of the hardness of diamonds the rate of attack is exceedingly slow even at voltages as high as 80–90 volts. At these high voltages the current energy required to sustain the spark-like discharge causes excessive fuming and volatilization of the electrolyte present and any control over the diameter of the boring is impossible due to the spreading of the spark-like discharge.

We have further found that under these conditions the electrode also is rapidly attacked and disintegrated and the drilling of relatively small holes having diameters less than about .002 inch is practically impossible.

Where radio frequency currents are employed, however, and relatively high voltages, spreading of the spark-like discharge is inhibited, excessive heating and fuming of the electrolyte is eliminated and the high frequency characteristics of the current stabilizes the drilling process and accelerates the rate of drilling, to such an extent that holes of substantially any desired diameter may be bored through diamonds of .050 inch thickness in from 2 to 3 hours as compared to days and weeks, using 60 cycle alternating current, in accordance with the Bergmann, et al., invention.

As one specific embodiment of the present invention reference should be made to the apparatus and equipment illustrated in the accompanying drawing, wherein:

Fig. 1 schematically shows a typical electrical circuit arrangement for producing high voltage radio frequency currents of determined frequency and the apparatus arrangement for adapting the same to the production of a spark-like discharge in the drilling of a hole in a diamond;

Figure 1:
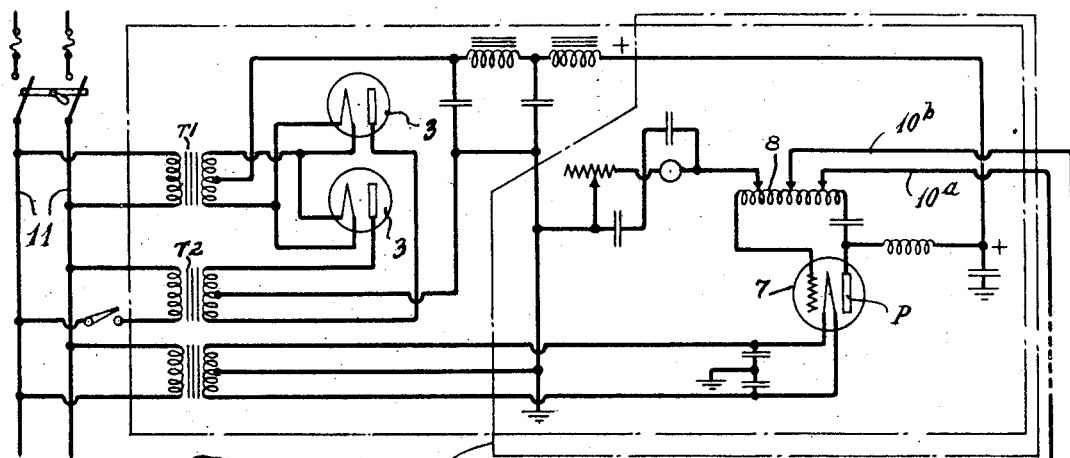

In the drawing, the circuit enclosed in dash line box G is a typical Hartley circuit for generating high voltage radio frequency current from a 60 cycle 120 volt alternating current supply source. The circuit arrangement, per se, forms no part of the present invention except insofar as the radio frequency current output thereof is controlled and regulated for the purposes of the present invention.

The circuit arrangement shown, however, as one skilled in the art will perceive, draws alternating current from the 60 cycle 120 volt supply lines 11, through transformers T1 and T2 and rectifiers 3—3, converting the alternating current drawn from the supply lines to direct current which is applied onto the plate electrode P of high frequency oscillator tube 7. The rectifier circuit shown is one adapted to apply a direct current voltage of about 1000 volts onto plate P of oscillator tube 7 and oscillator tube 7 is a 100 watt oscillator tube of a standard type well known in the art.

The oscillator tube 7 is electrically connected in a standard type of oscillating circuit known in the art as the Hartley circuit with a tank coil 8 in the grid-plate oscillating current. Tank coil 8, preferably is provided with a sufficient number of coil turns to produce a radio frequency current of from about 10 to about 30 meters wave length.

The selected voltages of the radio frequency current in tank coil 8 desired across electrodes A—B, for example 5000 volts, is tapped off from coil 8 in an auto-transformer arrangement and is conducted by conductors 10a—10b to electrodes A and B, electrode A being spring-sustained in point engagement with diamond D with diamond D sustained on electrically conductive member M of relatively large size as compared to diamond D and of relatively large electrode area as compared to the point area of electrode A, with the member M, diamond D and the point end of electrode A submerged in electrolyte solution S retained in container C a sufficient distance to provide a relatively thin film F of solution S over the surface of diamond D and around the point end of electrode A in contact therewith. Electrode B is sustained in contact with electrolyte solution S but in spaced relation to the submerged end of electrode A and diamond D but electrically connected through electrolyte S to member M.

We have found that where a radio frequency spark discharge is employed as the drilling agent for the diamond D, the depth to which the point end of electrode A and the upper face of diamond D may be submerged in electrolyte S must be limited to that sufficient to provide at most a relatively thin film of the solution S on the surface of the diamond at the point of contact of electrode A therewith.

This limitation appears to result from the circumstance that electrically the combination including electrode A, diamond D and member M is essentially a condenser, with diamond D the dielectric between electrode A and member M. This is apparent in view of the electrical connection through solution S between member M and electrode B.

When the level of solution S is above the level of the diamond and in contact with electrode A this condenser is short circuited through solution S to electrode B. When a high voltage alternating current is applied across electrodes A and B, the voltage pressure forces the solution away from the pointed end of electrode A forming a high resistance path and when the voltage is high enough and the resistance across the space gap to the electrolyte S higher than the resistance of the path through the diamond a leakage current will pass through the dielectric from the end of electrode A to member M thence through the solution S to electrode B.

As high frequency current will pass more readily through a dielectric than low frequency currents, the higher the frequency of the high voltage high frequency current the lower the voltage required to obtain this leakage current with any given diamond thickness or spacing between electrodes A and M, and for most purposes we prefer to employ frequencies within the range 6,000 to 30,000 kilocycles.

The spark discharge, however, results from the electrode area differential. The relatively small area of electrode A at the point of contact with diamond D induces a relatively high current density per unit area particularly along the side area thereof next adjacent the diamond surface, which high current density tends to ionize the gaseous atmosphere next adjacent the area and ultimately to cause a spark discharge across the space gap between the point on the electrode to the conducting area of the diamond. The spark discharge causes ionic bombardment of the electrode surface and diamond surface with consequent erosion or attrition of this area. As water vapor undoubtedly is present in the atmosphere surrounding the point end of electrode A, and possibly also ionized sulfuric acid (as solution S is a dilute solution of sulfuric acid) heavy-ion bombardment appears to be mainly responsible for the attrition of the diamond and electrode surfaces as a result of the spark discharges obtained.

Figure 2:
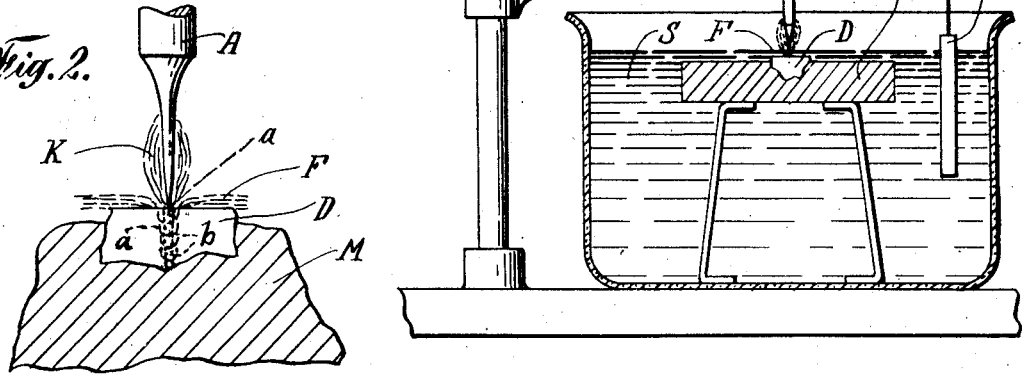
Fig. 2 is an enlarged sectional view illustrating the essential operating features of the present invention.

The situation developed resulting in the improved results of the present invention is indicated schematically in Fig. 2, wherein in enlarged view is shown film F of solution S pushed aside from the pointed end of electrode A under the influence of the high voltage of the high frequency current applied to electrode A; in dotted line (a) the path of leakage current through diamond D; the nature of the spark discharge K obtained showing that whereas the spark may tend to spread outwardly at a point on the electrode surface remote from the pointed end the general path of the spark is downwardly and inwardly towards the pointed end; and finally the normal path of the boring in plurality of dot-dash lines (b) through the diamond D.

As electrode A is subjected to intense heavy ion bombardment, it is preferred to employ a highly refractory and relatively hard heavy metal, such as tungsten, for electrode A. Electrode A, preferably consists of wrought tungsten wire provided with a pointed end. The cross-sectional area of the pointed end of electrode A must be materially less than the diameter of the hole desired through the diamond as the spark discharge normally tends to drill a hole somewhat larger in diameter than the diameter of the pointed end of electrode A.

In the drilling of relatively small diameter holes through diamond D it is preferable to employ the shorter wave length high frequency currents such as high frequency currents having more lengths within the range 10 to 30 meters, as with decrease in wave length the spread of the spark discharge away from the electrode end decreases.

Normally, and with diamond thicknesses approximating .050 inch, it appears unnecessary to employ voltages above about 5000 volts to produce the desired leakage current and the desired potentials to support the spark discharge. As the diamond thickness increases, however, generally speaking, higher voltages will be required.

Figure 3:
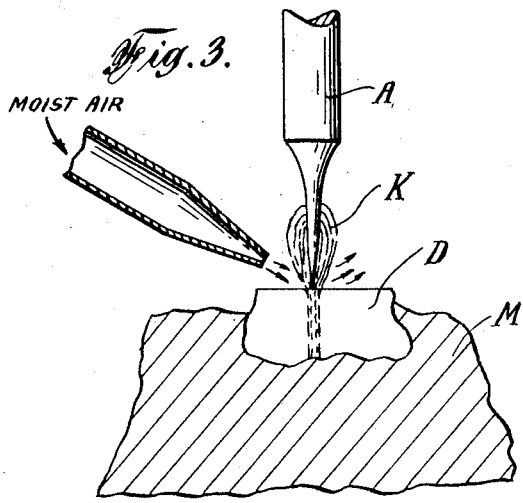
Fig. 3 is a modification of the present invention.
Figure 4:
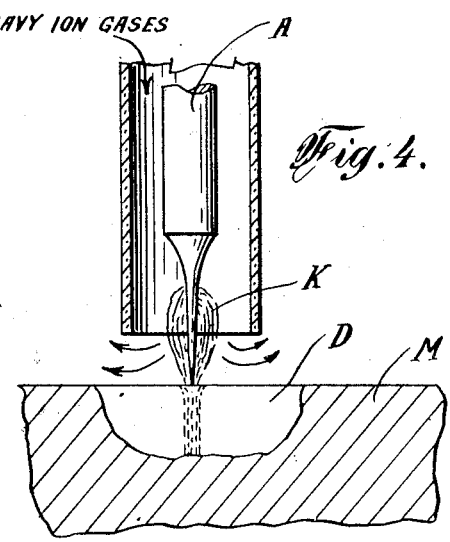
Fig. 4 is a second modification of the same.

As one specific improvement of the present invention, film F of solution S may be displaced by an atmosphere such as moist air, as indicated in Fig. 3 or by any ionizable gas containing heavy metal ions in sufficient amounts to sustain the spark discharge K and to provide an economically practical rate of drilling, such as for example, gas containing $CO_2$, $SO_2$, OH and the like heavy-ions singly or in various admixtures with air, and any of the monatomic gases (argon, neon and the like) or nitrogen, as indicated in Fig. 4. The gases may be preheated to facilitate ionization of the same at the electrode end, if desired.

From the above description of the present invention it is believed apparent that the same may be widely varied without essential departure therefrom and all such departures and modifications are contemplated as may fall within the scope of the following claims.

What we claim is:

1. The method of drilling cavities and holes in hard crystalline material, such as a diamond, which comprises electrically contacting one face of the diamond with an electrode of large surface area and an opposite face of the diamond with the pointed end of a pointed-end electrode sustained to be maintained in pointed-end contact with the said contacting surface of the said diamond and impressing on the said electrodes a high frequency electric current having a frequency within the range of frequencies known as radio frequency, at a voltage at least sufficient to provide a leakage current through the diamond between the said opposite faces thereof and an arc discharge from the pointed end of the electrode through the atmosphere surrounding the said pointed end to the diamond surface next adjacent the area thereof in contact with the said pointed end of said pointed-end electrode.

2. The method of claim 1, wherein the frequency of said high frequency electric current is within the range of frequencies 6000 to 30,000 kilocycles.

3. The method of claim 1, wherein the wave length of said radio frequency electric current is within the range 10 to 30 meters.

4. The method of claim 1, wherein the voltage of the said radio frequency electric current approximates 5000 volts where the wave length of the said current is within the range 10 to 30 meters where the thickness of the said diamond approximates .050 inch.

5. The method of claim 1, wherein the surface of the said diamond is covered with a relatively thin film of an electrolyte.

VICTOR O. ALLEN.
RICHARD A. MACINTOSH.